(12) United States Patent
Bodmer et al.

(10) Patent No.: US 6,558,149 B1
(45) Date of Patent: May 6, 2003

(54) INJECTION MOLDING MACHINE WITH DISPLACEABLE MOLDS, A HOLDING DEVICE AND A DIE HOLDER FOR SUCH AN INJECTION MOLDING MACHINE

(75) Inventors: Werner Bodmer, Haslach (DE); Rainer Armbruster, Wolfach (DE)

(73) Assignee: Foboha GmbH, Haslach (DE)

( * ) Notice: Subject to any disclaimer, the term of this patent is extended or adjusted under 35 U.S.C. 154(b) by 0 days.

(21) Appl. No.: 09/555,705

(22) PCT Filed: Nov. 25, 1998

(86) PCT No.: PCT/EP98/07600

§ 371 (c)(1),
(2), (4) Date: Jul. 24, 2000

(87) PCT Pub. No.: WO99/28108

PCT Pub. Date: Jun. 10, 1999

(30) Foreign Application Priority Data

Dec. 3, 1997 (EP) .............................................. 97121248

(51) Int. Cl.⁷ ................................................ B29C 33/30
(52) U.S. Cl. ................... 425/192 R; 425/112; 425/576; 425/588
(58) Field of Search ................................ 425/112, 116, 425/126.1, 127, 129.1, 190, 192 R, 588, 576, 589, 572, 574, 150; 264/254, 255, 328.8

(56) References Cited

U.S. PATENT DOCUMENTS

| | | | |
|---|---|---|---|
| 4,330,257 A | | 5/1982 | Rees et al. |
| 4,744,741 A | * | 5/1988 | Glover et al. ................ 425/123 |
| 4,929,166 A | * | 5/1990 | DiSimone et al. .......... 425/190 |
| 5,049,343 A | * | 9/1991 | Sorensen ..................... 264/255 |
| 5,643,613 A | * | 7/1997 | Bott et al. ................... 425/135 |
| 5,773,049 A | * | 6/1998 | Kashiwa et al. ............. 425/572 |
| 6,139,305 A | * | 10/2000 | Nesch ......................... 425/130 |

FOREIGN PATENT DOCUMENTS

| | | |
|---|---|---|
| DE | 3620175 C2 | 5/1989 |
| EP | 0 249 703 A2 | 4/1987 |
| EP | 0 549 928 A1 | 12/1992 |

OTHER PUBLICATIONS

Patent Abstracts of Japan, Publication No. 05299458, Publication Date Dec. 11, 1993.

* cited by examiner

*Primary Examiner*—Jan H. Silbaugh
*Assistant Examiner*—Emmanuel Luk
(74) *Attorney, Agent, or Firm*—Rankin, Hill, Porter & Clark LLP

(57) ABSTRACT

A holding device (1) for injection molding mold halves (61.2) or their holders contains two displacement units (2.1, 2.2), on each of which a rotation unit (4.1, 4.2) is attached. On each rotation unit (4.1, 4.2) there are holders (5.1, 5.2). Into the space (d) between the two holders (5.1, 5.2) a die holder designed as a prism-shaped rotating block can be inserted. The die holder in the holding device (1) can be displaced in one direction (z) and can be rotated around a displaceable axis (42.1, 42.2), which is vertical to the one direction (z). The displacement units (2.1, 2.2) can be displaced relative to one another to permit rapid and easy changing of injection molding molds (62.1).

11 Claims, 3 Drawing Sheets

INJECTION MOLDING MACHINE WITH DISPLACEABLE MOLDS, A HOLDING DEVICE AND A DIE HOLDER FOR SUCH AN INJECTION MOLDING MACHINE

BACKGROUND OF THE INVENTION

The invention relates to a holding device for molds, mold halves or die holders in an injection molding machine, furthermore a die holder, which can be inserted into this holding device, furthermore an injection molding machine containing this holding device and apart from this a process for the removing, respectively, inserting of a mold, mold half or a die holder in accordance with the generic terms of the independent claims.

Known injection molding machines frequently have the disadvantage of high setting-up or re-tooling times and costs, because the inserting, removing or changing of molds is complicated and time-consuming. The mold, half mold, resp., their holder is after all in the case of the known injection molding machines a part of the machine itself. This means that, in the case of a mold change, a part of the machine itself has to be changed. This is rendered more difficult by the fact that, for the purpose of cooling, hydraulic actuation, etc., various media, such as electric power, water (cold and hot), oil (cold and hot), air and/or other gases are introduced into the injection mold. The corresponding supply and return lines are connected to the mold, i.e., to the mold halves. Therefore, in the case of a mold change, these lines have to be disconnected from the old mold and connected to the new mold. This procedure requires time and work effort. The utilization of conventional injection molding machines is correspondingly expensive and not very flexible, if the molds have to be changed frequently. Modern injection molding plants, however, have to be in a position to change injection molds quickly and easily, in order to be able to immediately adapt their production to changing customer requirements and to other continuously changing demands and conditions.

For many applications of the injection molding process it is advantageous if the injection mold or one mold half can be rotated relative to the injection molding machine. With such a rotatable mold, the possibility exists of injecting the molten mass of plastic material into the mold from several injection stations, which typically are on opposite sides of the mold. With this arrangement, simultaneously molded components with differing geometrical shapes, different colors or ones made of different materials can be manufactured (multicomponent process). Therefore, molded components can be made that have different colors or which are made of several materials (assembly injection molding). If only a single injection station is used, such a rotatable mold provides the benefit of shorter cycle time. This is because, after a first injection cycle, the mold can be rotated and the molded components injected immediately beforehand can cool down and be ejected, while a second injection cycle is already in progress. With rotatable molds more cavities are available than in the case of non-rotatable molds. Apart from this, rotatable molds make intermediate stations for various options possible.

Injection molding machines with rotatable molds or mold halves are known. Thus, for example, U.S. Pat. No. 4,330, 257 teaches an injection molding machine with two die holders displaceable relative to one another and a core holder body in between, which has at least four side surfaces and which can be rotated around an axis vertical to the direction of displacement of the mold holder plates. On both mold holder plates there are first mold halves with forming cavities; the side surfaces of the core holder body are equipped with finger-like extrusions and together with these fingers form second mold halves. If the two mold holder plates are pushed against the core holder body, then the first and second mold halves are assembled into molds, into which molten mass is injected from two injecting stations. Injection molded components created by this are removed from the cavities on the fingers, The patent document DE-36 20 175 divulges an injection molding machine with at least two plastification and injection units and two mold holder plates. One of the mold holder plates is fixed, the other one can be displaced on spars. Between the mold holder plates there is a rotatable and also displaceable prism-shaped core holder body. Located on the mold holder plates are first, on the core holder body, second mold halves of the injection molds. By displacing the displaceable mold holder plate and the core holder body the first and second mold halves are assembled to an injection mold.

In the case of such injection molding machines with rotatable molds or mold halves, the disadvantage of the long re-tooling times because of difficult to change molds is particularly clearly noticeable. The molds or mold halves are respectively connected with a rotation mechanism, the distance of which from the molds or mold halves renders the mold change more difficult in addition.

SUMMARY OF THE INVENTION

The present invention is directed toward a holding device for a mold, mold half or die holder in an injection molding machine, that significantly reduces setting-up and re-tooling times, and therefore makes possible easy and rapid removal, insertion, and changing of the mold, mold half or the die holder. The present invention is further directed toward a die holder that can be inserted into the aforementioned holding device. Furthermore, the present invention is directed toward an injection molding machine that overcomes the disadvantages of prior art, and which permits short setting-up and re-tooling times are possible. The present invention is further directed toward a method for the easy and rapid removal, insertion, and changing of the mold, mold halves or of the die holder.

The invention breaks with the conventional concept, according to which the injection mold, resp., its holder is a component part of the injection molding machine itself. Instead of this the present invention provides the injection mold, the mold half, resp., its holder as a module, which can be inserted into the injection molding machine and changed as required. For this purpose, a holding device for at least one mold, mold half or a die holder in an injection molding machine is created. This holding device comprises at least two holding devices, which can be displaced relative to one another and possibly rotated, for the releasable clamping of the mold, mold half or the die holder. The holding device, not the mold itself, is a component part of the injection molding machine. On the holding device in accordance with the invention all media lines required are connected permanently. In contrast, different injection molds can be inserted into holding means or holding devices and changed again without any effort. The loss-free transfer of the different media from the holding device to the mold and vice-versa is assured by standardized interfaces.

A preferred embodiment of the holding device in accordance with the invention contains two displacement units. A rotating unit is mounted on each of the displacement units. On each rotating unit there are holding means for molds, mold halves or their holders. The displacement units can be displaced relative to one another in one direction, for example, on two spars respectively parallel to one another. Each rotating unit is rotatably mounted on the respective displacement unit such that it can be displaced with the displacement unit and rotated around an axis displaceable with the displacement unit, which axis is vertical to the direction of displacement. The holding means are affixed to the displacement units in such a way, that they are opposite one another, that their axes coincide and that the holding means have a certain spacing from one another, when the two displacement units are in a certain position relative to one another. In this one certain relative position, in the space between the two holding means a mold, a mold half or a die holder can be reversibly clamped.

The mold, the mold half or the die holder inserted into the holding device according to the invention can be displaced in one direction and possibly rotated around a displaceable axis vertical to the one direction. The displacement of the holding device can be actuated by means of, for example, hydraulic and/or electric driving means, and controlled or regulated with control or regulating means. The rotation of the holding means can, for example, be actuated by means of rotating driving means and can be controlled or regulated with rotation control or rotation regulating means.

A die holder in accordance with the invention is preferably a prism-shaped rotating block, the two base surfaces of which are facing the two holding means. The rotating block has at least two side surfaces, whereby at least one side surface accommodates an injection mold or an injection mold half.

The holding device in accordance with the invention is preferably inserted between two mold holder plates of an injection molding machine. In doing so, in preference one mold holder plate is permanently fixed to the machine while the other mold holder plate can be displaced in the same direction as the displacement units of the holding device. The mold holder plates each accommodate a first mold half. At least one, in preference two or more side surfaces of the prism-shaped block accommodate second mold halves. First and/or second form halves are equipped with forming cavities. When the mold holder plates are pressed against the rotating block, the first and second mold halves are joined together to form injection molds, into which a molten mass can be injected from injection stations.

For the removal of a mold, mold half or of a die holder from the device in accordance with the invention, the holding means are displaced relative to one another to such an extent that they release the mold, mold half or the die holder. Thereupon the mold, mold half or die holder is removed from the holding device.

For inserting a mold, mold half or a die holder into the holding device in accordance with the invention, the holding means are displaced to such an extent that they have a spacing between one another enabling the insertion of the mold, mold half or die holder. The mold, mold half or the die holder is inserted into the holding device. Thereupon, the holding means are displaced relative to one another into the one certain relative position, so that they clamp the mold, mold half or the die holder.

The holding device in accordance with the invention can be built into already existing injection molding machines. It provides both the benefits of the known injection molding machines with rotatable molds as well as the advantage of an easy mold change.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
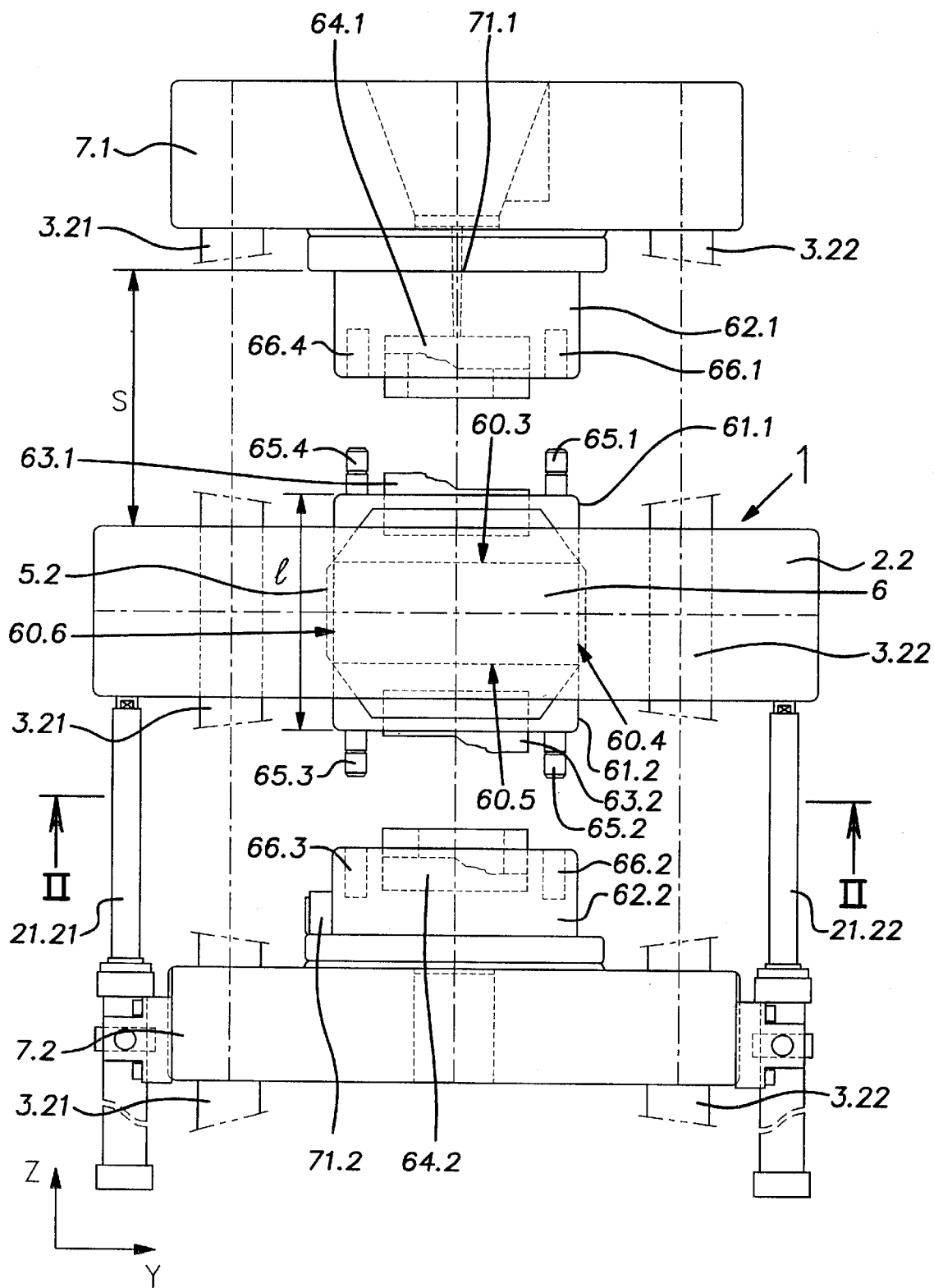
FIG. 1 is a plan view of a first embodiment of the holding device in accordance with the invention disposed within a part of an injection molding machine.
Figure 2:
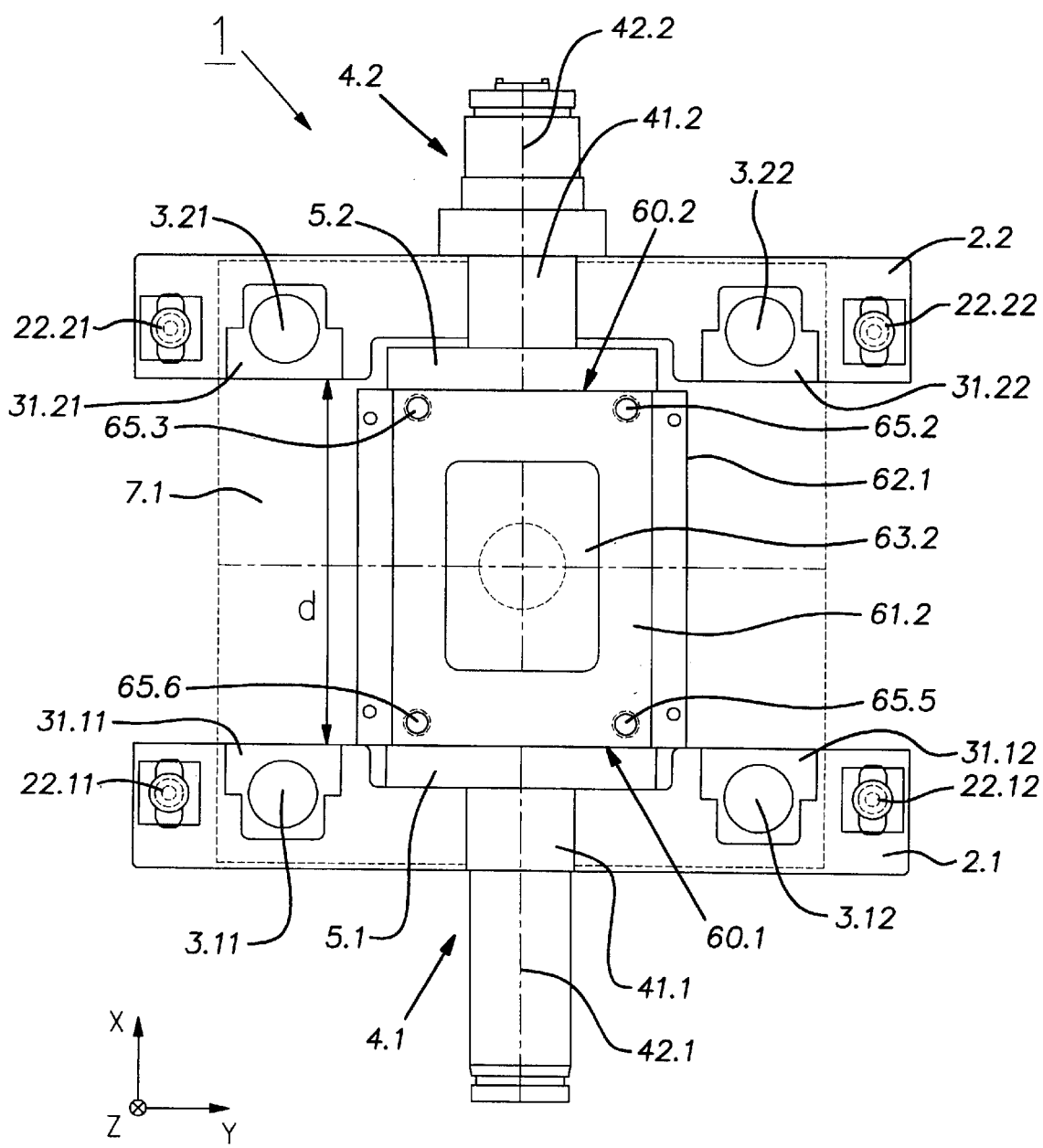
FIG. 2 is a front view of the holding device of FIG. 1.

The embodiment of the holding device 1 depicted in FIGS. 1 and 2 contains a first displacement unit 2.1 and a second displacement unit 2.2. The displacement units 2.1, 2.2 are formed, for example, from metal plates. They are each supported by two spars 3.11, 3.12, 3.21, 3.22 parallel to one another and are guided linearly on these with the help of guideways 31.11, 31.12, 31.21, 31.22. The guideways may be cylindrical sliding guideways, so that they can be displaced parallel to one another in a direction z. The displacement can be controlled and/or regulated by (not illustrated) control—and regulating means, such as hydraulic, mechanical or electrical distance measuring systems, limit switches, etc.

Attached to the first displacement unit 2.1 is a first rotating unit 4.1 and to the second displacement unit 2.2 a second rotating unit 4.2. Each rotating unit 4.1, 4.2 can be displaced with the respective displacement unit 2.1, 2.2; at least a part of each rotating unit 4.1, 4.2, for example a shaft 41.1, 41.2 can be rotated around an axis 42.1, 42.2, which can be displaced with the displacement unit 2.1, 2.2 and which is vertical to the direction of displacement z. The rotation of the rotating units 4.1, 4.2 can be, e.g., actuated hydraulically and/or electrically, for example with (not illustrated) rotation drive means such as a hydraulic system or a servomotor. The rotation drive means can be attached to a single displacement unit 2.2 or also to both displacement units 2.1, 2.2. Between the rotation drive means and the rotating unit 4.1, 4.2, a set of gears and/or a coupling (not illustrated) can be foreseen. The rotation of the rotating units 4.1, 4.2 can be controlled and/or regulated with the help of (not illustrated) rotation control—or rotation regulating means, such as rotation transmitters, limit switches, etc.

On the rotating units 4.1, 4.2, for example, at the ends of the shafts 41.1, 41.2, holding means 5.1, 5.2 for first mold halves 61.1, 61.2 or die holders 6 are attached. The holding means 5.1, 5.2 can, e.g., be executed as supporting plates with corresponding (not illustrated in detail) reversible fixing means. The displacement units 2.1, 2.2 are arranged—resp., displaceable relative to one another such that, in a certain relative position of the displacement units 2.1, 2.2, the two rotating units 4.1, 4.2 are opposite one another, their axes 42.1, 42.2 coincide and the two holding means 5.1, 5.2 have a certain spacing d from one another. FIGS. 1–4 illustrate the displacement units 2.1, 2.2 in this one certain position relative to one another.

Inserted in the space d between the two holding means 5.1, 5.2 is a prism-shaped rotating block 6. In this exemplary embodiment the rotating block 6 has the shape of a cube with two base surfaces 60.1, 60.2 and four (not necessarily the same size) side surfaces 60.3, 60.6. The rotating block 6 could, however, also have another, in preference even, number of side surfaces.

The two base surfaces 60.1, 60.2 of the rotating block 6 face the two rotating units 4.1, 4.2. The rotating block 6 in the holding device 1 can be displaced in a direction z and rotated around a displaceable axis vertical to this direction z; this axis is defined by the coinciding axes 42.1, 42.2 of the rotating units 4.1, 4.2. When the rotating block 6 is inserted, it connects the two rotating units with one another torsionally rigidly. Therefore, a single rotation drive unit is sufficient for rotating the two rotating units 4.1, 4.2 and the rotating block 6.

The opening of the holding device 1 in accordance with the invention is effected, for example, by displacing the second, upper displacement unit 2.2 relative to the first displacement unit 2.1 supporting the rotating block 6 by a sufficiently great distance s. Sufficiently great signifies that the distance s has to be greater than the length l of the rotating block 6, i.e., s>l. Such a displaced or open condition of the holding device 1 enables a rapid an easy removal, resp., changing of the rotating block 6.

For clamping the rotating block 6, for example, the second, upper rotating unit 4.2 can be displaceable in x-direction like a stamping die. For the removal of the rotating block 6, the second rotating unit 4.2 is initially displaced upwards in +x direction; then the second displacement unit 2.2 is, e.g., displaced in +z direction and the rotating block 6 removed. For inserting the rotating block 6, the rotating block is placed onto the first holding means 5. The second displacement unit 2.2 is brought into the one certain position relative to the first displacement unit 2.1 by displacing it, for example, in −z direction, so that the axes 42.1, 42.2 coincide. The second rotating unit 4.2 is lowered in −x direction, until the rotating block 6 is firmly clamped.

The holding device 1 in accordance with the invention is preferably utilized between two mold holder plates 7.1, 7.2 of a (not further illustrated) injection molding machine. In doing so, preferably one mold holder plate 7.1 is permanently fixed to the machine. The other mold holder plate 7.2 is guided linearly by the spars 3.11, 3.12, 3,21, 3.22 and displaceable in the same direction z as the displacement units 2.1, 2.2 of the holding device 1. This displacement is effected by driving means (not illustrated). The displacement units 2.1, 2.2 can be displaced by means of hydraulic, mechanical or electrical driving means 21.11, 21.12 (not visible) and 21.21, 21.22 relative to the displaceable mold holder plate 7.2. The driving means engage the displacement units 2.1, 2.2 at engagement points 22.11, 22.12, 22.21, 22.22. The displacement of the displacement units 2.1, 2.2 is actuated hydraulically, mechanically or electrically and is controlled or regulated by a hydraulic, mechanical or electrical distance measuring system (not shown). The distance measuring system ensures that, with the rotating block 6 clamped, the driving means 21.11, 21.12, resp., 21.21, 21.22 engaging the same displacement unit 2.1, resp., 2.2 always engage simultaneously and parallel to one another. The two displacement units 2.1, 2.2, however, can be driven and displaced independently of one another in order to enable a rapid changing of the rotating block.

At least one, in preference, however, two or more side surfaces 60.3, 60.5 of the prism-shaped rotating block 6 hold at least one first mold half 61.1, 61.2, each with a first mold insert 63.1, 63.2. Therefore, the prism-shaped rotating block 6 serves as die holder. The mold holder plates 7.1, 7.2 each hold a second mold half 62.1, 62.2, each with a second mold insert, 64.1, 64.2. First mold inserts 63.1, 63.2 and/or second mold inserts 64.1, 64.2 are equipped with (not illustrated in FIG. 1 and 2) forming cavities. When the mold holder plates 7.1, 7.2 with the help of the driving means are pressed against the rotating block 6, then the first and second mold halves 61.1, 61.2, 62.1, 62.2, resp., mold inserts 63.1, 63.2, 64.1, 64.2 are joined into injection molds, into which molten mass can be injected from injection stations 71.1, 71.2. For the unequivocal relative positioning of the first and second mold halves 61.1, 61.2, 62.1, 62.2, they are in preference equipped with guideways, for example, straight pins 65.1–6 and corresponding bores 66.1–4.

For rotating the prism-shaped rotating block 6, there are various procedures. In a first variant, in a first step the displacement units 2.1, 2.2 can be displaced away from the stationary mold holder plate 7.1 simultaneously and parallel to one another, holding the prism-shaped rotating block 6, together with the displaceable mold holder plate 7.2. In a second step, thereupon the displacement units 2.1, 2.2 are simultaneously and parallel to one another and holding the prism-shaped rotating block 6 displaced from the displaceable mold holder plate 7.2 in the direction of the stationary mold holder plate 7.1 and, for example stopped at the centre between the two mold holder plates 7.1, 7.2. In this position, thereupon in a third step, the prism-shaped rotating block 6 is rotated by 180°. In a fourth step, the displacement units 2.1, 2.2 and the rotating block 6 are again displaced towards the displaceable mold holder plate 7.2 and in a fifth step, together with the latter, displaced towards the stationary mold holder plate 7.1. In a second variant, in a first step the displaceable mold holder plate 7.2 could be displaced away from the displacement units 2.1, 2.2, rotating block 6 and stationary mold holder plate 7.1. In a second step, displacement units 2.1, 2.2 and the rotating block 6 are displaced approximately to the centre between the mold holder plates 7.1, 7.2 and stopped. In a third step, the rotating block 6 is rotated by 180°. In a fourth step, the displacement units 2.1, 2.2 and the rotating block 6 are displaced back towards the stationary mold holder plate 7.1. In a fifth step, the displaceable mold holder plate is displaced back towards the displacement units 2.1, 2.2, rotating block 6 and stationary mold holder plate 7.1. Further variants are implementable by the expert with the knowledge of the invention.

Figure 3:
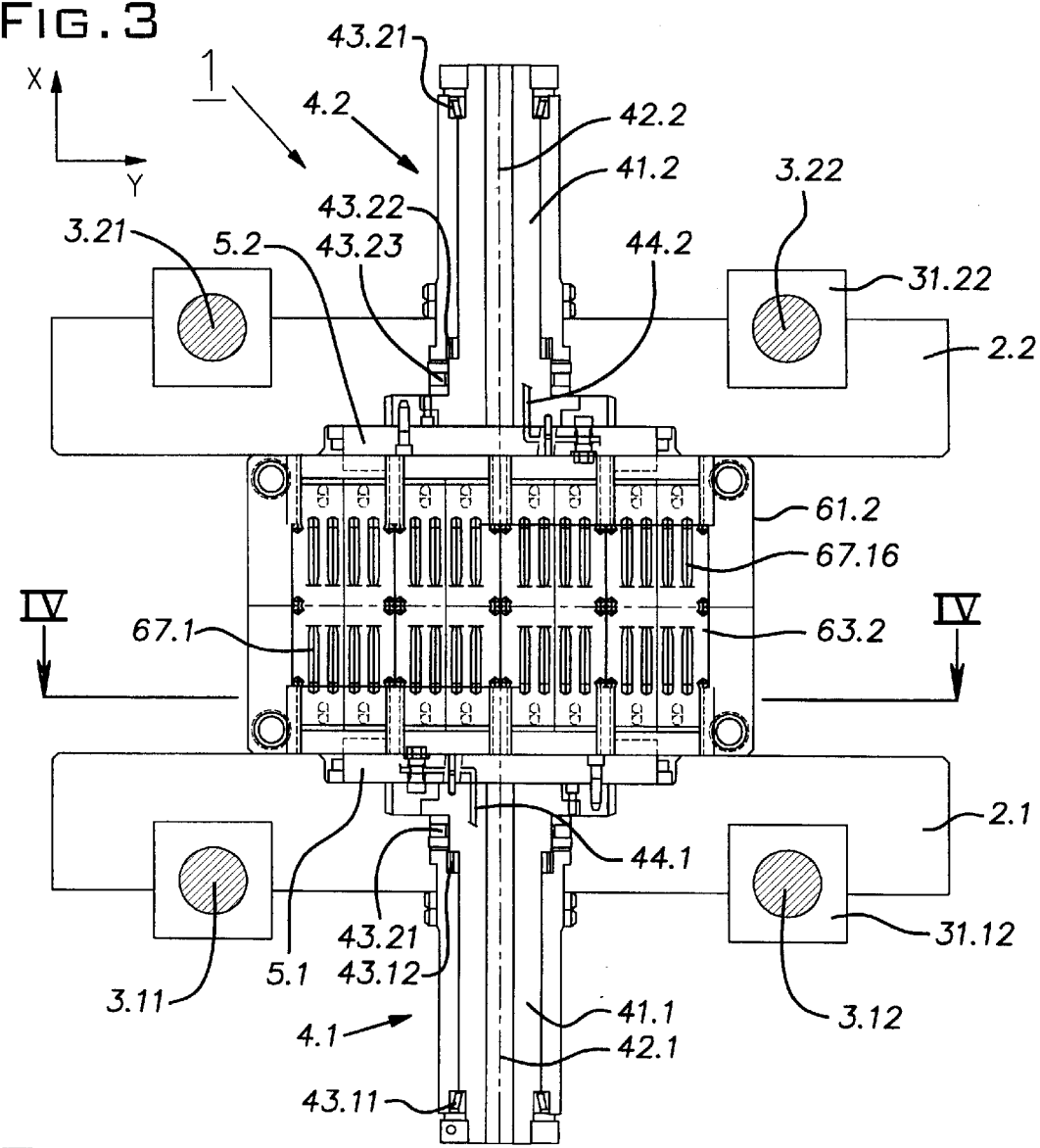
FIG. 3 is a partially sectional front view of a second embodiment of the holding device in accordance with the invention and FIG. 4 is a plan view of a part of the holding device of FIG. 3.
Figure 4:
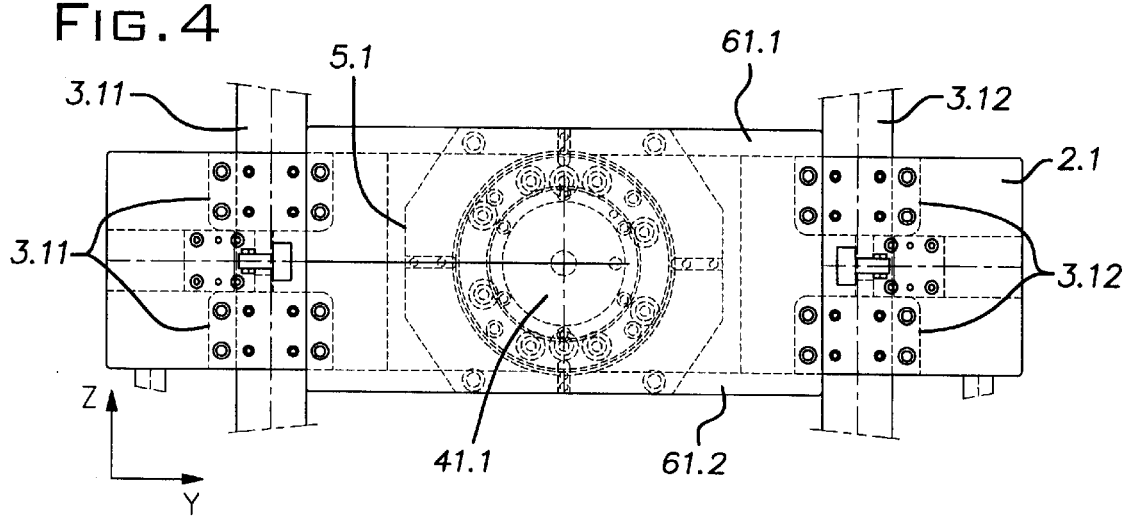

FIG. 3, shows a front view of an embodiment of the holding device in accordance with the invention, which is slightly different from that of the FIGS. 1 and 2. FIG. 4 illustrates a plan view of a part of the holding device of FIG. 3. In this embodiment, the linear guideways 31.11, 31.12, 31.21, 31.22 for the spars 3.11, 3.12, 3.21, 3.22 are attached to the outer sides 23.1, 23.2 of the displacement units 2.1, 2.2. The rotating units 4.1, 4.2 by means of bearings 43.11–13, 43.21–23 are rotatably mounted on the corresponding displacement units 2.1, 2.2.

By means of corresponding channels or lines 44.1, 44.2 in the first shaft 41.1 and/or the second shaft 41.2, media, such as gases, fluids or electric power are brought to the rotating block 6. In doing so, it is advantageous to conduct fluids such as gases and/or liquids through the first shaft 41.1 attached underneath and the electric power through the second shaft 41.2 attached on top, in order to prevent undesirable electrical contacts and contamination in the case of leaks. Between the holding means 5.1, 5.2 and the rotating block 6 (not illustrated) standardized interfaces for the transfer of the media are foreseen. In the open mold half 61.2, the forming cavities 67.1–16 for the accommodation of the molten mass are visible.

The invention also renders possible to the expert the implementation of other embodiments than those described here. Thus, for example, the holding means 5.1, 5.2 could be displaceable relative to one another in x-direction.

What is claimed is:

1. A holding device (1) for a mold, mold half (61.1, 61.2) or a die holder (6) for an injection molding machine, said injection molding machine comprising a fixed first mold holder plate (7.1) and a displaceable second mold holder plate (7.2) guided linearly by four parallel spars (3.11, 3.12, 3.21, 3.22) in a first direction (z), said holding device (1) comprising:
   a) a first and a second displacement unit (2.1, 2.2) arranged between said first and second mold holder plates (7.1, 7.2) of the injection molding machine;
   b) each displacement unit (2.1, 2.2) being supported by two adjacent spars (3.11, 3.12, 3.21, 3.22) of said injection molding machine and guided linearly on said two adjacent spars with the help of guideways (31.11, 31.12, 31.21, 31.22);
   c) each displacement unit (2.1, 2.2) being displaceable independent of one another by driving means (21.11, 21.12, 21.21, 21.22) along the two adjacent spars (3.11, 3.12, 3.21, 3.22) to a distance s, said distance s being sufficient to change the mold, mold half (61.1, 61.2) or die holder (6);
   d) said first and said second displacement unit (2.1, 2.2) comprising a first and a second opposite holding means (5.1, 5.2) for releasably clamping of the mold, mold half (61.1, 61.2) or die holder (6) therebetween.

2. The holding device (1) in accordance to claim 1, whereby the first and second holding means (5.1, 5.2) for the mold, mold half (61.1, 61.2) or die holder (6) are arranged for displacement relative to one another in a second direction (x) perpendicular to the first direction (z) such that the mold, mold half (61.1, 61.2) or die holder (6) can be removed or clamped.

3. The holding device (1) in accordance to claim 2, whereby the first and second holding means (5.1, 5.2) are adapted to pivot around a first and a second parallel axis (42.1, 42.2) of a first and a second rotating unit (4.1, 4.2) attached to the first and the second holding device (2.1, 2.2) and arranged perpendicular to the first direction (z).

4. The holding device (1) in accordance to claim 3, whereby a holding means (5.1, 5.2) for the mold, mold half or die holder has a standardized interface for loss-free transfer of different media from the holding device (1) to the mold, mold half (61.1, 61.2) or die holder (6), said different media being selected from the group consisting of gas, liquids and electricity.

5. The holding device (1) in accordance to claim 4, whereby said media is conducted through one of the shafts (41.1, 41.2).

6. A holding device (1) in combination with a mold, mold half (61.1, 61.2) or a die holder (6) for an injection molding machine, said injection molding machine comprising a fixed first mold holder plate (7.1) and a displaceable second mold holder plate (7.2) guided linearly by four parallel spars (3.11, 3.12, 3.21, 3.22) in a first direction (z), comprising:
   a) a first and a second displacement unit (2.1, 2.2) arranged between said first and second mold holder plates (7.1, 7.2) of the injection molding machine;
   b) each displacement unit (2.1, 2.2) being supported by two adjacent spars (3.11, 3.12, 3.21, 3.22) of said injection molding machine and guided linearly on said two adjacent spars with the help of guideways (31.11, 31.12, 31.21, 31.22);
   c) each displacement unit (2.1, 2.2) being displaceable independent of one another by driving means (21.11, 21.12, 21.21, 21.22) along the two adjacent spars (3.11, 3.12, 3.21, 3.22) to a distance s, said distance s being sufficient to change the mold, mold half (61.1, 61.2) or die holder (6);
   d) said first and said second displacement unit (2.1, 2.2) comprising a first and a second opposite holding means (5.1, 5.2) for releasably clamping of the mold, mold half (61.1, 61.2) or die holder (6) therebetween, wherein said first and second holding means (5.1, 5.2) for the mold, mold half (61.1, 61.2) or die holder (6) are arranged for displacement relative to one another in a second direction (x) perpendicular to the first direction (z) such that the mold, mold half (61.1, 61.2) or die holder (6) can be removed or clamped, and wherein said first and second holding means (5.1, 5.2) are adapted to pivot around a first and a second parallel axis (42.1, 42.2) of a first and a second rotating unit (4.1, 4.2) attached to the first and the second holding device (2.1, 2.2) and arranged perpendicular to the first direction (z), said first and second holding means (5.1, 5.2) having a standardized interface for loss-free transfer of different media from the holding device (1) to the mold, mold half (61.1, 61.2) or die holder (6), said different media being selected from the group consisting of gas, liquids and electricity; and, said mold, mold half (61.1, 61.2) or die holder (6) being insertable into said holding device, and having a standardized interface connectable to the standardized interface of the holding means (5.1, 5.2) for loss-free transfer of said different media.

7. A holding device (1) for a mold, mold half (61.1, 61.2) or a die holder (6) for an injection molding machine, said injection molding machine comprising a fixed first mold holder plate (7.1) and a displaceable second mold holder plate (7.2) guided linearly by four parallel spars (3.11, 3.12, 3.21, 3.22) in a first direction (z), said holding device (1) comprising:
   a) first and second displacement units (2.1, 2.2) arranged between said first and second mold holder plates (7.1, 7.2) of the injection molding machine and adapted for displacement in the first direction (z);
   b) each displacement unit (2.1, 2.2) being supported by two adjacent spars (3.11, 3.12, 3.21, 3.22) of said injection molding machine and guided linearly on said two adjacent spars by guideways (31.11, 31.12, 31.21, 31.22);
   c) the first and second displacement units (2.1, 2.2) comprising first and second opposite holding means (5.1, 5.2) for releasably clamping said mold, mold half (61.1, 61.2) or die holder (6) therebetween;
   d) the first and second holding means (5.1, 5.2) for the mold, mold half (61.1, 61.2) or die holder (6) being adapted for displacement relative to one another in a second direction (x), said second direction being perpendicular to the first direction (z) such that the mold, mold half (61.1, 61.2) or die holder (6) can be removed or clamped.

8. The holding device (1) in accordance to claim 7, whereby the first and second holding means (5.1, 5.2) are adapted to pivot around first and second parallel axes (42.1, 42.2) of a first and a second rotating unit (4.1, 4.2) attached to the first and the second holding device (2.1, 2.2) and arranged perpendicular to the first direction (z).

9. The holding device (1) in accordance to claim 8, whereby a holding means (5.1, 5.2) for the mold, mold half or die holder has a standardized interface for loss-free transfer of different media from the holding device (1) to the mold, mold half (61.1, 61.2) or die holder (6), said different media being selected from the group consisting of gas, liquids and electricity.

10. The holding device (1) in accordance to claim 9, whereby said different media is conducted through one of the shafts (41.1, 41.2).

11. A holding device (1) in combination with a mold, mold half (61.1, 61.2) or a die holder (6) for an injection molding machine, said injection molding machine comprising a fixed first mold holder plate (7.1) and a displaceable second mold holder plate (7.2) guided linearly by four parallel spars (3.11, 3.12, 3.21, 3.22) in a first direction (z), comprising:

a) first and second displacement units (2.1, 2.2) arranged between said first and second mold holder plates (7.1, 7.2) of the injection molding machine and adapted for displacement in the first direction (z);

b) each displacement unit (2.1, 2.2) being supported by two adjacent spars (3.11, 3.12, 3.21, 3.22) of said injection molding machine and guided linearly on said two adjacent spars by guideways (31.11, 31.12, 31.21, 31.22);

c) the first and second displacement units (2.1, 2.2) comprising first and second opposite holding means (5.1, 5.2) for releasably clamping said mold, mold half (61.1, 61.2) or die holder (6) therebetween;

d) the first and second holding means (5.1, 5.2) for the mold, mold half (61.1, 61.2) or die holder (6) being adapted for displacement relative to one another in a second direction (x), said second direction being perpendicular to the first direction (z) such that the mold, mold half (61.1, 61.2) or die holder (6) can be removed or clamped, wherein said first and second holding means (5.1, 5.2) are adapted to pivot around first and second parallel axes (42.1, 42.2) of a first and a second rotating unit (4.1, 4.2) attached to the first and the second holding device (2.1, 2.2) and arranged perpendicular to the first direction (z), and wherein the holding means (5.1, 5.2) for the mold, mold half or die holder has a standardized interface for loss-free transfer of different media from the holding device (1) to the mold, mold half (61.1, 61.2) or die holder (6), said different media being selected from the group consisting of gas, liquids and electricity; and, said mold, mold half (61.1, 61.2) or die holder being insertable into the holding device (1) and having a standardized interface connectable to the standardized interface of the holding means (5.1, 5.2) for loss-free transfer of said different media.

* * * * *